United States Patent [19]

Wood et al.

[11] Patent Number: 4,999,647

[45] Date of Patent: Mar. 12, 1991

[54] SYNCHRONOUS STIMULATION FOR LONG ARRAY CONTINUOUS INK JET PRINTER

[75] Inventors: Wendell L. Wood; Brian G. Morris, both of Dayton; Dianne J. Aleshire, Xenia; James A. Katerberg, Kettering, all of Ohio

[73] Assignee: Eastman Kodak Company, Rochester, N.Y.

[21] Appl. No.: 458,208

[22] Filed: Dec. 28, 1989

[51] Int. Cl.[5] .............................................. G01D 15/18

[52] U.S. Cl. .................................. 346/75; 346/140 R

[58] Field of Search .............................. 346/75, 140 R

[56] References Cited

U.S. PATENT DOCUMENTS

| | | | |
|---|---|---|---|
| 4,138,687 | 2/1974 | Cha et al. | 346/75 |
| 4,587,528 | 5/1986 | Beaudet | 346/75 |
| 4,646,104 | 2/1987 | Braun | 346/1.1 |
| 4,683,477 | 7/1977 | Braun et al. | 346/75 |
| 4,703,330 | 10/1987 | Cupepper | 346/75 |
| 4,827,287 | 5/1989 | Braun et al. | 346/75 |

*Primary Examiner*—Bruce A. Reynolds
*Assistant Examiner*—Gerald E. Preston
*Attorney, Agent, or Firm*—John D. Husser

[57] ABSTRACT

A drop ejection device for continuous ink jet printing includes a rectangular solid divided by parallel, elongated through-slots between its major surfaces, into a plurality of approximately identical dilatational regions. Each such region has a longitudinal mechanical resonance mode approximately the same as the desired drop ejection frequency. The body has an ink supply manifold adjacent a drop ejection face, which is normal to the longitudinal axis of the through-slots. An orifice plate having a linear orifice array, substantially longer than the through-slots, is attached to the ejection face. A plurality of elongated piezoelectric strips pairs are attached in opposing positions on major surfaces of each dilatational region. Upon actuation, said strips expand and contract to effect synchronous stimulation at the desired drop frequency.

11 Claims, 2 Drawing Sheets

SYNCHRONOUS STIMULATION FOR LONG ARRAY CONTINUOUS INK JET PRINTER

FIELD OF INVENTION

The present invention relates to continuous ink jet printers and, more particularly, to improved constructions for stimulating synchronous drop break-up of the ink jet filaments issuing from long orifice arrays in such printers.

BACKGROUND OF INVENTION

In continuous ink jet printing, ink is supplied under pressure to a manifold region that distributes the ink to a plurality of orifices, typically arranged in a linear array(s). The ink discharges from the orifices in filaments which break into droplet streams. The approach for printing with these droplet streams. The approach for printing with these droplet streams is to selectively charge and deflect certain drops from their normal trajectories.

In order to selectively apply charge to the ink droplets it is necessary to control the locations the drops break-offs from the filaments to occur within a predetermined charge region, downstream from the orifice plate. Such control is effected by applying an energy signal of predetermined frequency and amplitude(s) to the ink filaments. Such filament break-up control, called stimulation, maintains uniform drop size and drop spacing, as well as controlling the drop break-off region.

A great number of different approaches have been developed to effect such stimulation of the ink filaments. Common general approaches are to impart the stimulation energy to ink in the manifold region or to apply it to the orifice plate. The optimum goal in applying stimulation energy is for each ink filament to receive signals, of exactly the same frequency and amplitude, that are precisely in phase. Such synchronous stimulation would enable precisely predictable time periods for imparting information charge and avoid any printing errors incident to improper droplet charging.

U.S. Pat. No. 4,646,104 describes a highly desirable system for achieving synchronous stimulation with a relatively short (e.g. 64 orifice) array. This system uses a rectangular solid print head body of high acoustic Q material, such as stainless steel, that is elongated in the direction normal to the locus of orifice plate attachment. That is, the length of the body in the desired predominate vibration direction is substantially greater than its other dimensions, and the ink manifold and orifice plate are located at one of the longitudinal ends of the body, normal to its longitudinal axis. The size of the print head body is selected, in view of its material composition, to exhibit a resonant frequency, in the longitudinal vibration mode, that is proximate the desired drop frequency of the ink drop streams. A pair of piezoelectric strips are mounted symmetrically on opposite sides of the body and constructed to expand and contract in the directions of the body's longitudinal axis.

The approach described above works well for short orifice arrays. However, because of the rectangular solid geometry needed to implement the longitudinal vibrational mode philosphy, the '104 patent approach has not been applied to longer orifice arrays, e.g. in the order of 4" or longer. In such longer array devices, travelling wave stimulation of the orifice plate (e.g., see U.S. Pat. No. 4,827,287) and stimulation by vibration of the ink with a transducer located in the manifold region (e.g. see U.S. Pat. Nos. 4,138,687 and 4,587,528) have been the chosen approaches. Travelling wave stimulation loses the advantages of synchronous drop break-off. Stimulation applied to ink in the manifold region involves energy transmission losses and variations and therefore is not as effective as stimulation of the filaments via orifice plate vibration. It also is complicated and expensive to construct such stimulating devices because of the need to avoid vibrational coupling to the orifice plate.

SUMMARY OF INVENTION

One significant objective of the present invention is to provide an improved construction for providing synchronous stimulation to relatively longer arrays of continuous ink jet printing streams with vibrational energy imparted to ink filaments from the orifice plate. Related advantages of embodiments of the invention are efficient transmission of vibrational energy to the orifice plate and flow paths for supplying ink to the orifices of the print head in directions aligned with the drop stream directions.

In one aspect the present invention constitutes an improved drop ejection device for continuous ink jet printing and includes a rectangular solid resonator/manifold body divided, by parallel, elongated through-slots between its major surfaces, into a plurality of approximately identical dilatational regions. Each such region has a longitudinal mechanical resonance mode approximately equal to the desired drop ejection frequency. The body has an ink supply recess formed in a drop ejection face, which is normal to the longitudinal axis of the through-slots. An orifice plate having a linear array(s) of orifices substantially longer than the through-slots is attached to the ejection face. At least one elongated piezoelectric strip is attached on a major surface of a dilatational region, with the longitudinal axis of expansion and contraction of the strip parallel to the through-slots. Upon synchronous energization of the strip(s), at the desired drop frequency, ink streams ejected through the orifice plate are synchronously stimulated by the orifice plate at the desired drop frequency.

BRIEF DESCRIPTION OF THE DRAWINGS

The subsequent description of preferred embodiments refers to the accompanying drawings wherein.

DETAILED DESCRIPTION OF PREFERRED EMBODIMENTS

Figures 1, 2, 7:
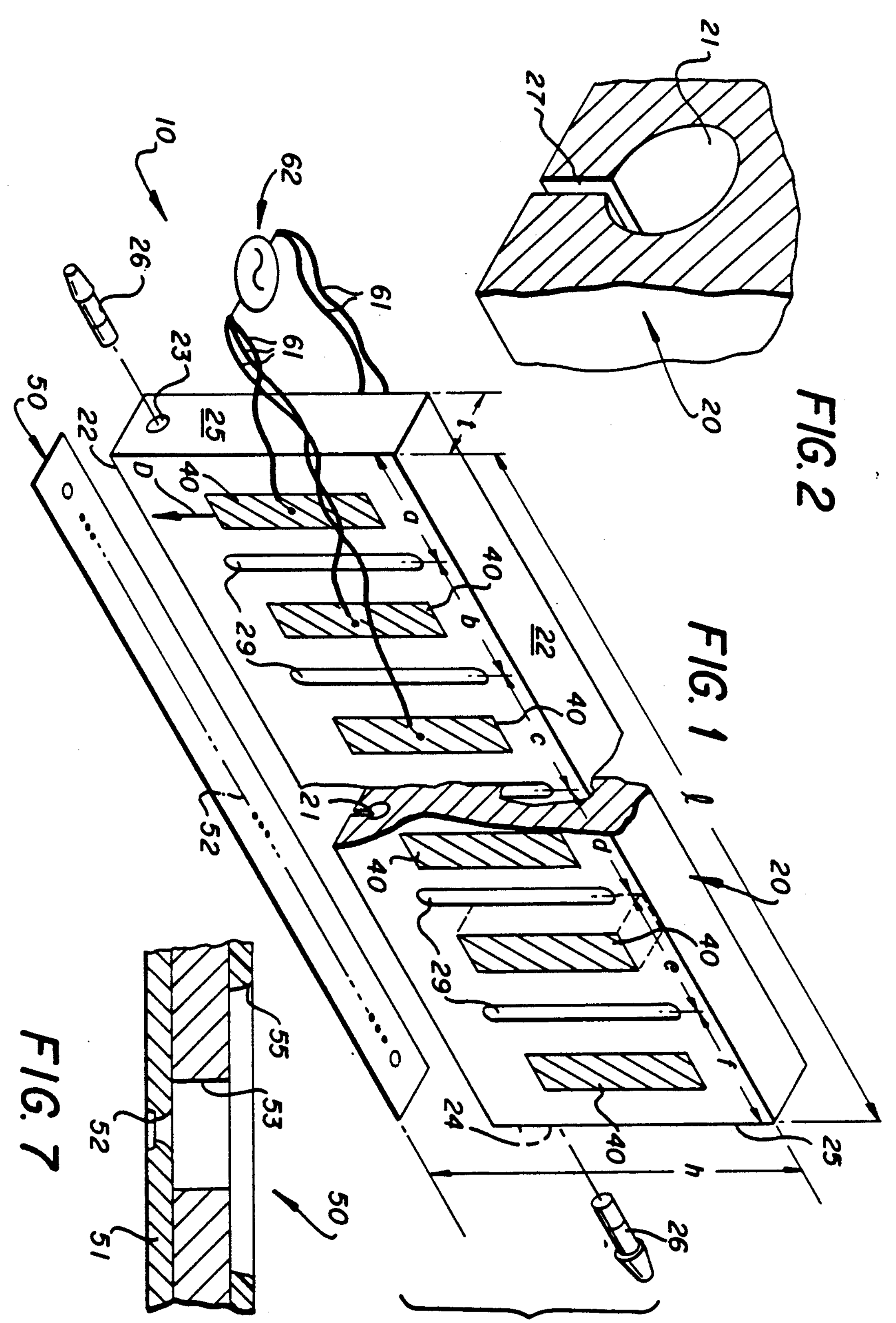
FIG. 1 is an exploded perspective view, partially in cross-section, and showing schematic electrical circuits, of one preferred print head drop ejection device in accord with the present invention.
FIG. 2 is an enlarged perspective view of a portion of the resonator/manifold body of the FIG. 1 device.
FIG. 7 is an enlarged cross-section of the FIG. 6 orifice plate.

FIG. 1 illustrates schematically the components that cooperate to comprise a preferred embodiment of a drop ejection device in accord with the present invention. It will be understood that such drop ejection device, denoted generally 10, cooperates with other known components used in ink jet printers. That is the device 10 functions to produce the desired streams of uniformly sized and spaced drops in a highly synchronous condition. Other continuous ink jet printer components, e.g. charge and deflection electrodes, drop catcher, media feed system and data input and machine control electronics (not shown) cooperate with the drop streams produced by device 10 to effect continuous ink jet printing. The device 10 is constructed to provide synchronous drop streams in a long array printer, and comprises in general a resonator/manifold body 20, a plurality of piezoelectric transducer strips 40, an orifice plate 50 and transducer energizing circuitry 60.

The resonator/manifold body 20 is constructed of a high acoustic Q material, e.g. stainless steel, and in the form of a predeterminedly dimensioned rectangular solid, the length (l) of which is substantially greater than its height (h), which body height (h) is substantially greater than the body thickness (t). As shown in FIGS. 1 and 2 a cylindrical ink supply bore 21 extends that length of the body 20 spaced upwardly from, and parallel to a longitudinal edge 22 (herein termed the drop ejection face of the body). The bore 21 terminates in ink inlet and outlet openings 23, 24 in the side edges 25 of the body 20, and metal couplings 26 having matching inner diameters to the bore 21 are attached to connect to the bore printer ink supply and return lines (not shown). The couplings should be hermetically attached, e.g. by adhesive, so stimulation energy is not transmitted to the metal couplings. A narrow slot 27 extends from bore 21 perpendicular to the drop ejection face so as form an ink flow channel in the desired direction, i.e. generally normal to the drop ejection edge. In certain fabrications, it may be useful to provide an outwardly tapered end 28 to the slot 27, as shown in the FIG. 5 modified embodiment.

In the start-up operation, the ink flows through the reservoir from inlet port 23 and to outlet port 24. This allows contaminants and debris to be washed away from the orifices of the orifice plate. In the printing operation, the outline line is closed so that ink is directed to the orifices by means of slot 27 (e.g. in one preferred embodiment about 0.020" wide and 0.100 inches tall). As shown in FIG. 1 slot 27 runs the length of the orifice array (e.g. in one preferred embodiment about 4.25 inches long). The thin slot functions to straighten the ink flow to the individual orifices and keeps the ink pressure uniform over the array. Providing straight (i.e. generally normal to the orifice plate face) ink flow to each orifice is important because this will determine the staightness of the jets issuing from the orifices. Providing uniform pressure enables uniform break-off length of the jet filaments and accurate drop charging. In this connection it is also preferred that the inlet sectional area of the bore be large compared to the total open area of the orifices to minimize orifice pressure variation.

The body 20 is divided by a plurality of uniformly sized and spaced through-slots 29 into a plurality of approximately identical dilatational regions (denoted a through f in FIG. 1). The dimensions of the body 20 and size and position of the slots 29 are predeterminedly selected (in connection with the material of the body) so that each of sections a to f has a longitudinal mechanical resonance mode that is approximately equal to the desired drop frequency. As shown, the through-slots 29 preferably are elongated in the direction perpendicular to the drop ejection face of the body 20. Their width dimension can be as small as accommodates their fabrication and their length extends over at least a major portion of the body height dimension h, with a longitudinal axis perpendicular to the drop ejection face. However, the length of slots 29 is selected to be not so long as to allow flexure of the portions joining the segments.

As shown in FIG. 1, piezoelectric crystals 40 in the form of elongated strips are attached, e.g. with adhesive, in opposing pairs on each major surface of each of the regions "a" through "f". Desirably, the strips 40 are elongated and mounted symmetrically, with their longitudinal dimensions perpendicular to the drop ejection face 22. Preferably, they are approximately centered in the height direction on the longitudinal resonance nodal plane P of the resonator/manifold body 20 (see FIG. 4). However, the coupling of the segments near the body edges allows uniform stimulation that is substantially independent of exact crystal location. Thus, in many applications less than a pair of opposing strips per segment is needed. Even a single strip oriented with its longitudinal axis of expansion and contraction parallel to the through-slots will provide operative stimulation. However, the multi-strip embodiment is preferred because it facilitates stimulation at lower voltage levels.

The resonator/manifold body 20 is electrically grounded and the exterior surfaces of each crystal strip is coupled by leads 61 to an electrical energy source 62 which provides a voltage that varies in polarity to cause the crystals to lengthen and contract alternately along the axis direction D shown in FIG. 1. Such energization causes the separate dilatational sections a through f to each lengthen and contract in synchronization with its adhered transducers and, thus, in accord with the signal from source 62. When mounted at the nodal plane P, by pins 44 in recesses 45 (see FIG. 4), each segment of the resonator/manifold body will be vibrating (dilating) uniformly because each segment has approximately identical geometry and mass. When the orifice plate 50 is properly bonded onto the bottom surface of resonator/manifold body, such vibration will cause the orifice plate to reciprocate at the desired frequency (through planes normal longitudinal axis of strips 40), with the orifices maintaining substantially coplanar relations in each of the vibratory positions. This in turn causes the ink filaments to break-up uniformly and within a small phase difference window (e.g. less than 180°). It is preferable to also provide one or more feed back piezoelectric crystals on a segment(s) of the resonator body, to facilitate vibration amplitude detection and adjustment (see U.S. Pat. No. 4,473,830).

One preferred construction of orifice plate 50 can be seen in more detail in FIG. 7. The orifice plate preferably is electroformed, e.g. of bright nickel or nickel alloy as described in U.S. Pat. No. 4,184,925, and can comprise a first layer 51 defining a plurality of orifices 52 and a second layer which adds stiffness and defines an orifice plate channel 53.

In prior art approaches, solder has been utilized to bond resonators and orifice plates. However, the high bonding temperature causes orifice plates to bow. Also, the solder flow does not provide a uniform coupling layer thickness. Such defects are acceptable in shorter arrays but are accentuated in longer arrays causing excessive phase and straightness variations. Therefore, we have developed improved ways to bond the orifice plate 50 to the resonator 40. Such procedures and constructions are particularly useful in long array devices but also are useful in shorter array devices.

In one aspect, the improved procedures involve use of polymers, such as an epoxy, to couple the orifice plate and resonator. While such adhesives are advantageous in avoiding high temperatures, they characteristically damp more energy than solder metals. We have found, however, that if high modulus epoxy is used in uniformly thin layers (see layer 55 in FIG. 7), highly successful bonding constructions can be achieved.

One highly preferred adhesive is a two part epoxy formulated by Epoxy Technology, Billerica, Massachusetts, and designated 353 ND. This material was chosen due for its inherent inertness to inks and relatively good adhesion to the orifice plate and resonator; however, the epoxy is modified to achieve some specific properties. To increase the durability of the adhesive/adherend (orifice plate and resonator) interface, a coupling agent is mixed into the epoxy. For this purpose CA0750 (aminopropyltriethoxysilane) from Huls America, Inc., is used. To aid in processing and removing air, an anti-foaming agent from Ultra Additives, Patterson, New Jersey, designated DEE FO 300 is used.

A typical weight percent mixture is below:

100% 353 ND resin
10% 353 ND catalyst
1% CA0750
2% DEE FO 3000

Prior to applying such bonding materials the surfaces to be coupled are cleaned, rinsed and dried. As noted, a thin uniform bondline is necessary to reduce any energy losses across the adhesive thickness. In addition, control of adhesive flow is better obtained with a small volume. In a preferred aspect of the invention, we use silk screening to apply a controlled, thin, uniform amount of adhesive. For example, the screen can be 325 mesh with 1.1 mils diameter stainless steel wire, and provide a 1 mil wet thickness of adhesive. Such control of the adhesive layer is also highly preferred to avoid adhesive bridging of the narrow slot of the resonator.

Proper alignment of the orifice array to the resonator slot is also important for uniform jet stimulation. To achieve this, cooperating alignment elements **57*a*, 57*b* and 58*a*, 58*b* are fabricated on both the orifice plate and resonator. More specifically, referring to FIGS. 3, 6 and 8 it can be seen that orifice plate 50 has a circular hole 57*a* and an elgonated hole (slot) 58*a* electroformed at its ends. The hole and slot are precisely located, by photofabrication, vis a vis the orifice array 52. The hole and slot design is preferred to allow for tolerance stack-ups. Similarly, a circular hole and slot 57*b*, 58*b* are formed in the surface of the resonator bottom. Recesses 57*b*, 58*b* are countersunk to provide relief for edge build-up of openings 57*a*, 58*a*** of the electroformed orifice plate.

Figures 3, 4, 5, 6, 8, 9A, 9B:
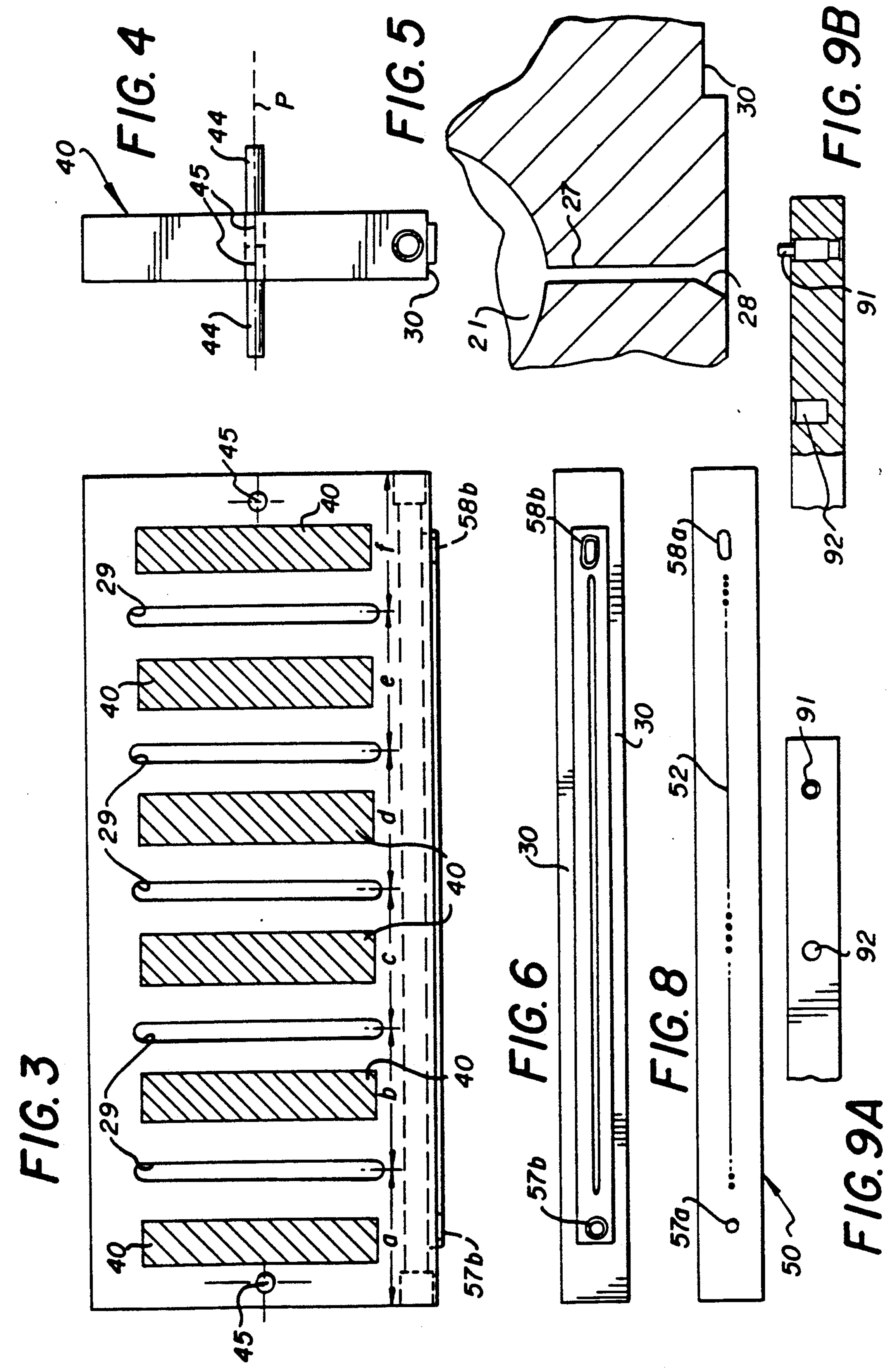
FIG. 3 is an elevation of one of the major surfaces of the resonator/manifold body of the FIG. 1 embodiment.
FIG. 4 is an end view of FIG. 3.
FIG. 5 is an enlarged cross-section of a portion of the resonator/manifold body shown in FIG. 3.
FIG. 6 is a bottom view of the resonator/body shown in FIG. 3.
FIG. 8 is a plan view of the FIG. 1 orifice plate face which is joined to the manifold edge of the resonator/manifold body.
FIGS. 9A and 9B are respectively a top and side view of a fixture device for use in adhesively coupling the orifice plate in accord with the present invention.

During electroforming of the orifice plate, plating that builds-up at its edges can vary and prevent successful bonding. However, the plates are essentially uniform in thickness interior of these edges. As shown in FIGS. 4 and 5, in another preferred aspect, the resonator 40 is formed to have a recessed periphery 30 to avoid resonator contact with the non-uniform thickness orifice plate edges during bonding. The countersunk peripheries of hole and slot **57*b*, 58*b*** provide similar relief. This assures that bonding takes place between highly uniform surfaces.

In assembly a fixture 90 is used to hold the orifice plate flat during bonding. Pins 91 can be screwed upwardly to extend from the fixture and are used to align the orifice plate to the resonator by extending through openings **57*a*, 58*a* and into recesses 57*b*, 58*b*. Magnets 92, embedded in the body of fixture 90** hold the orifice plate during adhesive coupling operations. The total weight of these fixtures components (re size and density) is selected such that proper bond takes place without excess flow of the adhesive. Desirably, the weight provides a pressure of about 0.1 to 0.2 psi during bonding. Preferably, the ultimate thickness of the bond layer is 1 mil or less.

The invention has been described in detail with particular reference to certain preferred embodiments thereof, but it will be understood that variations and modifications can be effected within the spirit and scope of the invention.

We claim:

1. A print head device for use in continuous ink jet printing, said device comprising:

(a) a resonator and ink supply body comprising a rectangular solid formed of high acoustic Q material and having:
  (i) a length substantially greater than its height and a height substantially greater than its thickness;
  (ii) an ink manifold region formed in said body to supply ink to a drop ejection face that is located on a thickness surface along its length dimension; and
  (iii) a plurality of slots extending normally through the major surfaces of said blocks, said slots having longitudinal axes perpendicular to said drop ejection face and being mutually parallel and equidistantly spaced to segment said block into a plurality of dilatational portions which have substantially identical longitudinal mode, mechanical resonant frequencies that are approximately equal to the nominal drop frequency;

(b) a plurality of elongated piezoelectric strips affixed in pairs on opposing surfaces of said dilatational regions;

(c) an orifice plate attached to said drop ejection face and having an elongated array of orifices extending along the length dimension of said block; and (d) means for synchronously energizing said transducers to expand and contract longitudinally at the desired drop frequency.

2. The invention defined in claim 1 further comprising a thin, uniform thickness layer of high-modulus epoxy adhesive coupling said orifice plate to said resonator.

3. The invention defined in claim 2 wherein said resonator has recessed regions along the peripheral edges of the surface coupled to said orifice plate.

4. The invention defined in claim 2 wherein said coupled orifice plate and resonator surfaces comprise interfitting alignment elements.

5. The invention defined in claim 4 wherein said alignment elements are photofabricated.

6. A print head device for use in continuous ink jet printing, said device comprising:

(a) a resonator/manifold body portion comprising a rectangular solid formed of high acoustic Q material and having:
   (i) a predominate longitudinal vibration direction;
   (ii) an ink supply bore from adjacent one longitudinal end surface of said body portion; and
   (iii) a slot, of smaller cross-section than said bore, extending from said bore to end an surface of said resonator;

(b) an orifice plate having a linear array of orifices located in precise alignment with said slot; and (c) a thin, uniform layer of high modulus adhesive coupling said orifice plate to said end surface of said resonator.

7. The invention defined in claim 6 wherein said end surface resonator has recessed regions along peripheral edge portions to accommodate edge thickness variations of said orifice plate.

8. The invention defined in claim 6 wherein said orifice plate and resonator surfaces comprise interfitting alignment elements to effect accurate coupling.

9. The invention defined in claim 8 wherein said alignment elements are photofabricated.

10. An improved drop ejection device for continuous ink jet printing comprising:

(a) a resonator/manifold comprising a rectangular solid body divided by parallel, elongated through-slots into a plurality of dilatational regions that each have a longitudinal mechanical resonance mode approximately equal to the desired drop ejection frequency, said body having an ink supply recess formed in a drop ejection face, which is normal to the longitudinal axis of said through-slots;

(b) an orifice plate having a linear array(s) of orifices substantially longer than the through-slots attached to said drop ejection face; and (c) at least one elongated piezoelectric strip pair attached on a major surface of a dilatational region, said strip having its longitudinal axis of expansion and contraction parallel to said slots.

11. The invention defined in claim 2 wherein said adhesive layer has a uniform thickness of 1 mil or less.

* * * * *